100,000 United States Patent [11] 3,622,617

| | | | | |
|---|---|---|---|---|
| [72] | Inventors | Hermann Windel<br>Frankenthal, Pfalz;<br>Adolf Fischer, Mutterstadt, Pfalz, both of<br>Germany | [51] Int. Cl. | C07c125/06 |
| | | | [50] Field of Search | 260/468 C,<br>471 C |
| [21] | Appl. No. | 730,893 | | |
| [22] | Filed | May 21, 1968 | [56] References Cited | |
| [45] | Patented | Nov. 23, 1971 | UNITED STATES PATENTS | |
| [73] | Assignee | Badische Anilin- & Soda-Fabrik<br>Aktiengesellschaft<br>Ludwigshafen, Rhine, Germany | 3,404,975  10/1968  Wilson et al. | 260/471 |
| | | | Primary Examiner—Charles B. Parker | |
| | | | Assistant Examiner—L. Arnold Thaxton | |
| [32] | Priority | May 31, 1967 | Attorney—Marzall, Johnston, Cook & Root | |
| [33] | | Germany | | |
| [31] | | B 92798 | | |

[54] UREIDOPHENYL PHENYL CARBAMATES
2 Claims, No Drawings

[52] U.S. Cl. ........................................................ 260/471 C,
71/111, 260/468 C, 260/553 C

ABSTRACT: Substituted ureidophenyl phenyl carbamates and the use of said compounds for controlling unwanted plant growth.

UREIDOPHENYL PHENYL CARBAMATES

The present invention relates to valuable new substituted ureidophenyl phenyl carbamates and methods of controlling unwanted plants with these compounds, in particular to methods of controlling unwanted plants without damaging the crop plants.

It is known that methyl N-3,4-dichlorophenyl carbamate may be used as a herbicide (U.S. Pat. specification 3,116,995). However its action is not satisfactory. The use of 2-chloro-4,6-bis(ethyl-amino)-s-triazine as herbicide is also known.

An object of the present invention is to provide valuable new substituted ureidophenyl phenyl carbamates which have good herbicidal properties. Another object of the invention is to provide a method for controlling unwanted plant growth with substituted ureidophenyl phenyl carbamates, especially for controlling unwanted plant growth without damaging the crop plants.

These and other objects of the invention are achieved with substituted ureidophenyl phenyl carbamates having the formula

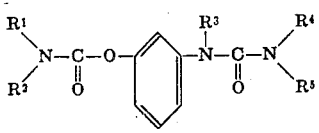

in which $R^1$ denotes a phenyl radical which may be substituted by halogen, nitro, methoxy, carboxy, lower alkyl or lower haloalkyl, or a cycloaliphatic radical having three to eight carbon atoms in the cycloaliphatic ring which may be substituted by halogen or alkyl and $R^2$, $R^3$, $R^4$ and $R^5$ denote hydrogen, methoxy, a phenyl radical, or a saturated or unsaturated aliphatic radical which may be substituted by halogen. Compounds in which $R^4$ denotes 1-butynyl-(3) also exhibit good action.

The compounds according to the invention may be prepared by reacting m-aminophenol with the appropriate carbamyl halides, preferably the chlorides, if desired in the presence of agents binding hydrogen halide, or with the appropriate isocyanates to the corresponding ureas which are substituted on the phenyl radical in m-position by the hydroxy group. These ureas are converted with the appropriate carbamyl halide, preferably the chloride, if necessary in the presence of agents binding hydrogen halide, or with the appropriate isocyanate to form carbamic esters.

The following experiments (parts by weight) will illustrate the preparation of the compounds according to the invention.

EXPERIMENT 1

10.8 parts of dimethylcarbamyl chloride is slowly added to a suspension of 21.8 parts of m-aminophenol in 50 parts of dioxane while stirring at 20° to 40° C., the mixture is stirred for 8 hours at room temperature (20° C.) and the dioxane is distilled off. The residue is washed with water and N-(m-hydroxyphenyl)-N',N'-dimethylurea is obtained in a purity which is adequate for further processing (m.p. 183° to 184° C.).

If methylcarbamyl chloride is used instead of dimethylcarbamyl chloride, N-(m-hydroxyphenyl)-N'-methylurea is obtained.

If phenylcarbamyl chloride is used instead of dimethylcarbamyl chloride, N-(m-hydroxyphenyl)-N-phenylurea is obtained.

9.3 parts of N-(m-hydroxyphenyl)-N',N'-dimethylurea, 10 parts of pyridine and 7.7 parts of p-chlorophenyl isocyanate are kept in an autoclave for 8 hours at 60° C. The mixture is then treated with water and the residue is filtered off and dried. The m-(3,3-dimethylureido)-phenyl N-p-chlorophenyl carbamate thus obtained has a melting point of 112° to 114° C. and the following structural formula

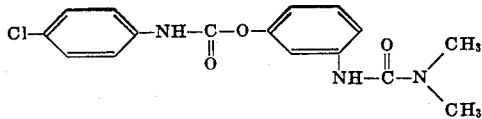

EXPERIMENT 2

A solution of six parts by weight of phenyl isocyanate in 50 parts of benzene is added at 20° to 30° C. to a suspension of 9.3 parts of N-(m-hydroxyphenyl)-N',N'-dimethylurea and 0.5 part of pyridine in 100 parts of benzene. The whole is stirred for 6 hours at 60° C. and the residue if filtered off. The m-(3,3-dimethylureido)-phenyl phenyl carbamate has a melting point of 180° to 182° C.

If N-(m-hydroxyphenyl)-N'-methylurea or N-(m-hydroxyphenyl)-N'-phenylurea is used instead of N-(m-hydroxyphenyl)-N',N'-dimethylurea, 3-methylureido or 3-phenylureido phenyl ester derivatives are obtained.

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high-boiling points such as kerosene or diesel oil, coal tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. The agents may also be applied in granulated form.

Insecticides, fungicides, bactericides and other herbicides may be added to the agents or the latter may be mixed with fertilizers.

Dusts may be prepared by mixing or grinding the active ingredients with a solid carrier.

The following examples illustrate the application of the agents according to the invention.

EXAMPLE 1

The plants barley (Hordeum vulgare), wheat (Triticum vulgare), Indian corn (Zea mays), beet (Beta vulgaris), wild mustard (Sinapis arvensis), common chickweed (Stellaria media), white goosefoot (Chenopodium album), small nettle (Urtica urens) and barnyard grass (Panicum crus galli) were treated at a growth height of 2 to 12 cm. with 2 kg. per hectare of each of the following active ingredients:

m-(3,3-dimethylureido)-phenyl N-p-chlorophenyl carbamate I methyl N-3,4-dichlorophenyl carbamate II m-(3,3-dimethylureido)-phenyl N-3,4-dichlorophenyl carbamate III m-(3,3-dimethylureido)-phenyl N-3,4-dimethylphenyl carbamate IV
   m.p. 102° to 104° C.

m-(3,3-dimethylureido)-phenyl N-methylphenyl carbamate V
   m.p. 164° to 166° C.

m-(3,3-dimethylureido)-phenyl N-3-methylphenyl carbamate VI m-(3,3-dimethylureido)-phenyl N-4-methoxyphenyl carbamate VII
   m.p. 138° to 140° C.

m-(3,3-dimethylureido)-phenyl N-3-methoxyphenyl carbamate VIII
   m.p. 148° to 150° C.

m-(3,3-diethylureido)-phenyl N-3-m-chlorophenyl carbamate IX m-(3-methylureido)-phenyl N-3-m-chlorophenyl carbamate X m-(3-methylureido)-phenyl N-3,4-dichlorophenyl carbamate XI m-(3-methylureido)-phenyl N-2-chlorophenyl XII each dispersed in 500 liters of water per hectare. After 2 to 3 weeks it was observed that the new active ingredients have a stronger herbicidal action and are better tolerated by beet than active ingredient II.

m-(3,3-dimethylureido)-phenyl N-m-chlorophenyl carbamate
  m.p. 125° to 127° C.
m-(3,3-dimethylureido)-phenyl N-2,4,5-trichlorophenyl carbamate
  m.p. 148° to 150° C.
m-(methylureido)-phenyl N-o-methylphenyl carbamate
  semisolid substance
m-(methylureido)-phenyl N-m-methylphenyl carbamate
  semisolid substance

| Active ingredient | I | II | III | IV | V | VI | VII | VIII | IX | X | XI | XII |
|---|---|---|---|---|---|---|---|---|---|---|---|---|
| Crop plants: | | | | | | | | | | | | |
| Barley | 0 | 10 | 0 | 0-10 | 10 | 10 | 10 | 10-20 | 10 | 10-20 | 10 | 10-20 |
| Wheat | 0 | 10-20 | 0 | 10 | 10 | 0-10 | 10 | 10 | 10 | 10 | 0-10 | 10 |
| Indian corn | 0 | 0-10 | 0-10 | 10 | 0-10 | 10 | 10 | 0-10 | 0-10 | 10 | 10 | 10 |
| Beet | 0-10 | 30 | 10 | 20-30 | 10 | 20-30 | 20 | 20-30 | 20 | 30 | 20 | 20-30 |
| Unwanted plants: | | | | | | | | | | | | |
| Wild mustard | 90-100 | 80-90 | 90-100 | 90-100 | 90 | 90-100 | 90 | 90 | 90 | 90-100 | 90 | 90-100 |
| White goosefoot | 90-100 | 80 | 90-100 | 90-100 | 90 | 100 | 90-100 | 90-100 | 90 | 100 | 90-100 | 100 |
| Small nettle | 100 | 90-100 | 90-100 | 100 | 90-100 | 100 | 90-100 | 90-100 | 90-100 | 90-100 | 90-100 | 100 |
| Barnyard grass | 70-80 | 40-50 | 70-80 | 70 | 60-70 | 90-100 | 60-70 | 70 | 60-70 | 70-80 | 70 | 80 |

NOTE.—0=No action; 100=complete kill.

EXAMPLE 2

An agricultural plot which was overgrown with wild mustard (Sinapis arvensis), white goosefoot (Chenopodium album), small nettle (Urtica urens), common chickweed (Stellaria media), gallant soldier (Galinsoga parviflora) and annual meadow grass (Poa annua) was treated when the weeds were 2 to 6 cm. high with m-(3,3-dimethylureido)-phenyl N-p-chlorophenyl carbamate (I) and, for comparison, with 2-chloro-4,6-bis(ethylamino)-s-triazine (II), each at a rate of 5 kg. per hectare dispersed in 500 liters of water. After 7 to 8 days it could be observed that compound I had a stronger herbicidal action than compound II. After 4 to 5 weeks almost all the plants had completely withered.

The following compounds have the same biological action at I in examples 1 and 2:

m-(3,3-dimethylureido)-phenyl N-phenyl carbamate
  m.p. 180° to 182° C.
m-(3,3-dimethylureido)-phenyl N-o-chlorophenyl carbamate
m-(3,3-dimethylureido)-phenyl N-o-methylphenyl carbamate
  m.p. 154° to 156° C.
m-(3,3-dimethylureido)-phenyl N-o-methoxyphenyl carbamate
m-(3-phenylureido)-phenyl N-o-methylphenyl carbamate
  m.p. 127° to 136° C.
m-(3-phenylureido)-phenyl N-p-methylphenyl carbamate
  m.p. 206° to 210° C.
m-(3-phenylureido)-phenyl N-m-methylphenyl carbamate
  semisolic substance

What we claim is:

1. A substituted ureidophenyl phenyl carbamate having the formula

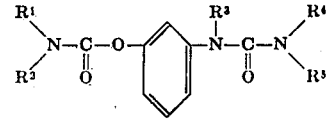

in which $R^1$ denotes phenyl or phenyl substituted by chlorine, methoxy or lower alkyl, and $R^2$, $R^3$, $R^4$ and $R^5$ each denote hydrogen, methyl, methoxy or phenyl while $R^4$ may further denote 1-butynyl-(3).

2. M-(3,3-Dimethylureido)-phenyl N-p-chlorophenyl carbamate.

* * * * *